No. 790,618. PATENTED MAY 23, 1905.
J. A. CLEMENTS.
FARM SWING GATE.
APPLICATION FILED JULY 18, 1904.
2 SHEETS—SHEET 1.
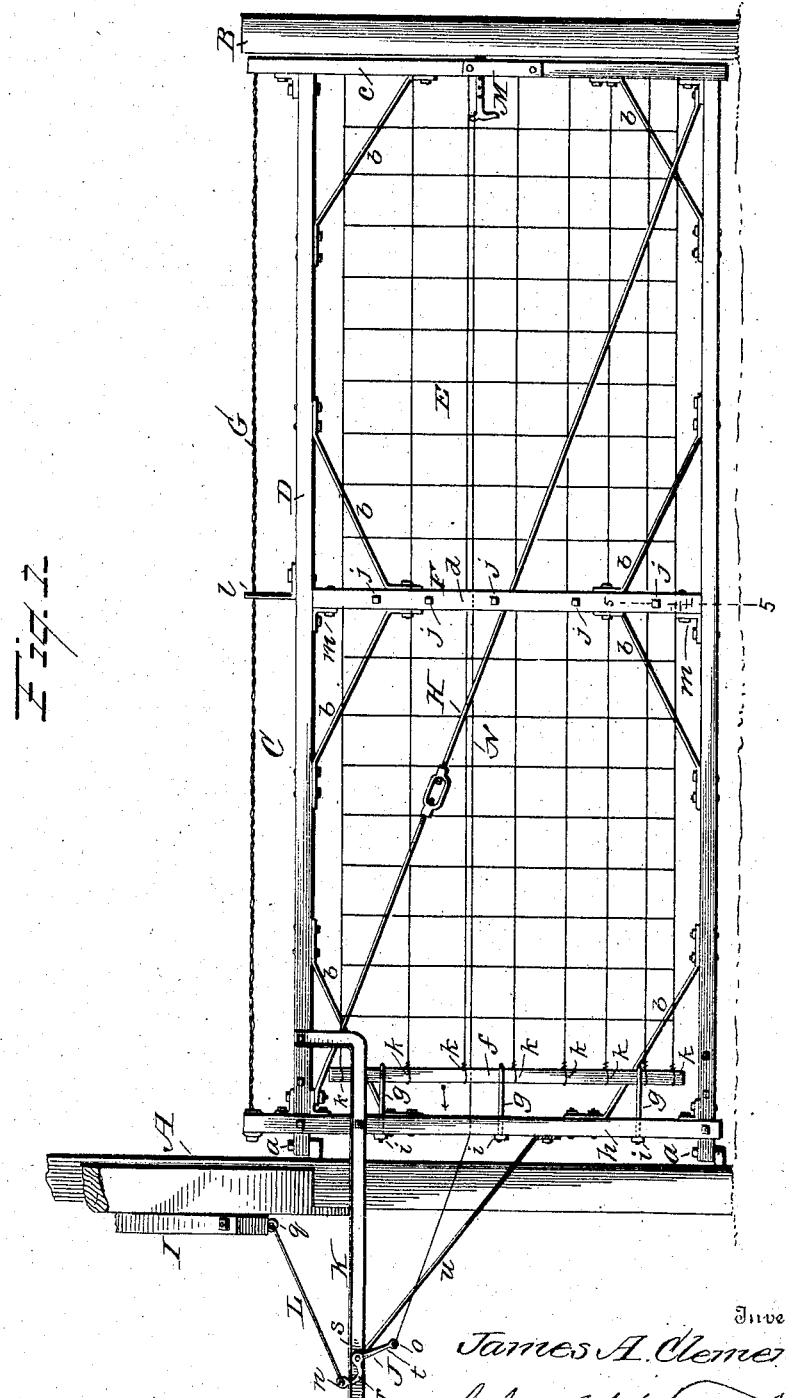

No. 790,618. PATENTED MAY 23, 1905.
J. A. CLEMENTS.
FARM SWING GATE.
APPLICATION FILED JULY 18, 1904.
2 SHEETS—SHEET 2.
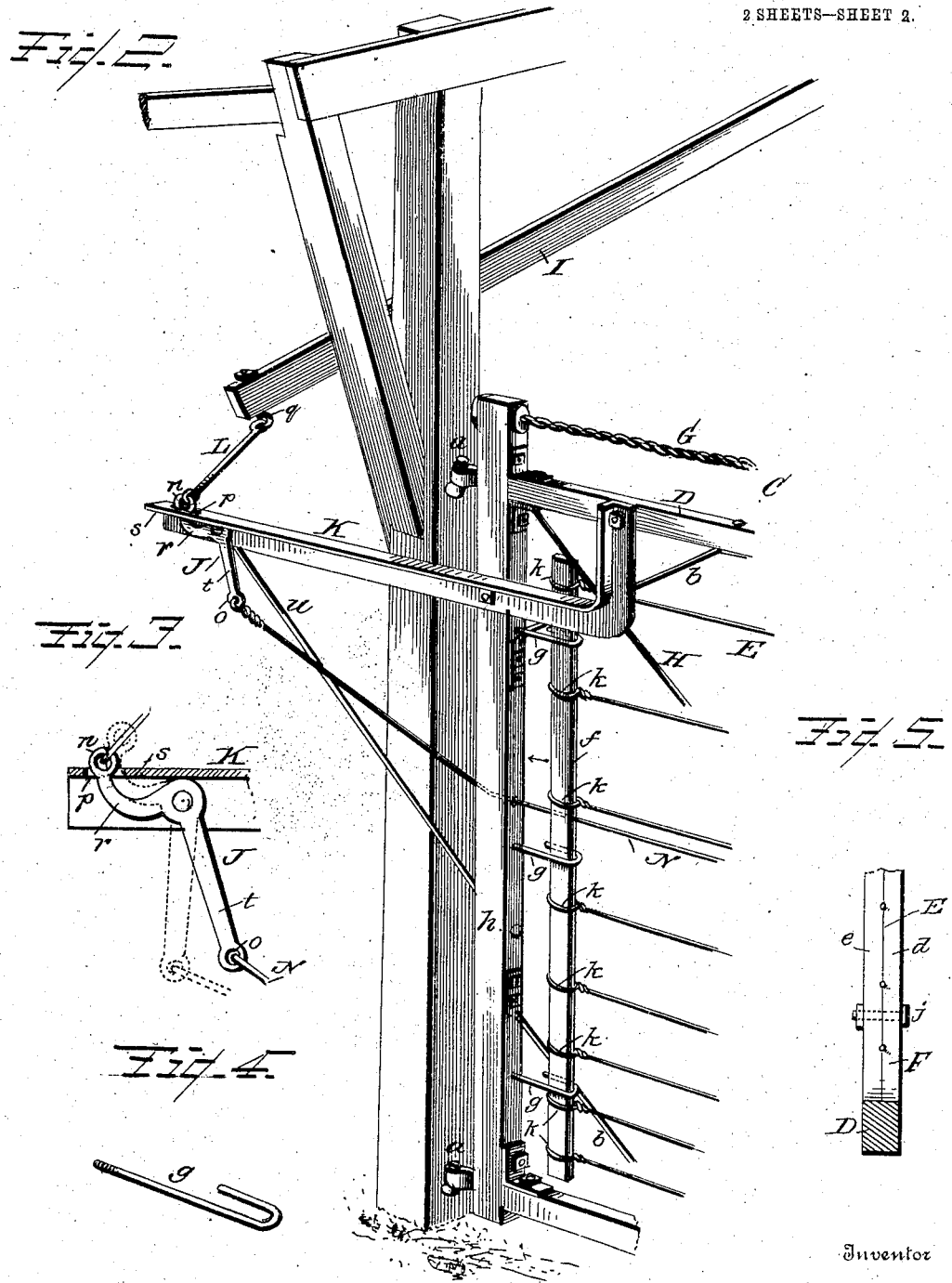
Witnesses
C. J. Williamson.
M. E. Moore
Inventor
James A. Clements.
By Chas. N. Fowler
Attorney No. 790,618.

Patented May 23, 1905.

UNITED STATES PATENT OFFICE.

JAMES A. CLEMENTS, OF ABINGDON, ILLINOIS.

FARM SWING-GATE.

SPECIFICATION forming part of Letters Patent No. 790,618, dated May 23, 1905.

Application filed July 18, 1904. Serial No. 216,996.

*To all whom it may concern:*

Be it known that I, JAMES A. CLEMENTS, a citizen of the United States, residing at Abingdon, in the county of Knox and State of Illinois, have invented certain new and useful Improvements in Farm Swing-Gates; and I do hereby declare that the following is a full, clear, and exact description of the same, reference being had to the annexed drawings, making a part of this specification, and to the letters of reference marked thereon.

The present invention has for its object to provide a swinging farm-gate that will be simple in construction and effective in operation and in which means are secured for tightening the woven wire should the same become slack from any cause; and the invention consists in a farm-gate constructed substantially as shown in the drawings and hereinafter described.

Figure 1 of the drawings is a side elevation of a gate constructed in accordance with my invention; Fig. 2, a detail perspective, on an enlarged scale, showing one end of the gate, the gate-post, and connections between the gate and post; Fig. 3, a detail view, partly in section, showing the bell-crank lever and a portion of the L-shaped arm to which it is pivoted; Fig. 4, a perspective view of one of the bolt-hooks employed for stretching the wire of the gate; Fig. 5, a detail sectional view taken on line 5 5 of Fig. 1.

In the accompanying drawings, A B represent the two gate-posts, and C the gate, suitably hinged at $a$ to the former post in any preferred manner.

The gate C consists of a main frame D, with a plurality of short braces $b$ and the woven wire E, stretched bodily in said frame, with center upright bar F, which is in two parts, and when the gate is complete the center upright bar forms a central support for the gate and also performs the function of a clamp to hold the wire E firmly to its work. The woven wire E is arranged and placed in the center of the gate. Consequently the wire may be kept taut and in strain without warping the main frame of the gate, which is considered of material importance.

One end of the woven wire E connects with the end bar $c$ of the main frame D in any desirable manner, the wires passing between the separable sections $d\ e$ of the center upright bar F, as shown in Fig. 5 of the drawings, and the opposite end of the woven wire connects with an independent straining-bar $f$. To the straining-bar $f$ are connected a plurality of bolt-hooks $g$, the shanks thereof passing through holes in the end bar $h$ of the main frame D, and nuts $i$ engage the projecting screw-threaded ends thereof, whereby means are provided for taking up the slack in the woven wire by stretching it bodily, said means remaining with the gate.

Should the wire become slack from any cause when in use, it may be quickly tightened by tightening the nuts $i$ on the bolt-hooks $g$, the bolts $j$, which hold the sections $d\ e$ of the center upright bar F together, being first loosened, after which the straining-bar $f$ may be drawn in a direction toward the post A, as indicated by the arrow in Figs. 1 and 2 of the drawings, this being accomplished by turning the nuts on the bolt-hooks in the proper direction.

I do not wish to be understood as limiting my invention to the means employed for taking up the slack bodily in the woven wire, as other means may be employed so long as it forms a part of the gate mechanism and remains therewith, so as it will be within convenient reach of the operator at any time it may be found necessary to tighten the wire.

The woven wire E may be connected to the end bar $c$ of the main frame D and to the straining-bar $f$ in any desirable manner, but preferably by loops $k$ upon the ends of the horizontal wires, through which the straining-bar $f$ is passed after the woven wire has been suitably secured to the end bar of the main frame, the bolt-hooks being then engaged with the straining-bar and passed through the end bar $h$ of the main frame D and the nuts $i$ engaging the screw-threads upon the shanks of the bolt-hooks, when the woven wire may be stretched, as hereinbefore described.

A suitable truss-rod H is connected to the main frame of the gate, and the separable clamping-section $e$ of the upright bar F is secured to the stationary section $d$ through the medium of the bolts $j$, the stationary section of the upright bar being securely fastened to the main frame of the gate by suitable brackets $m$.

Any desirable means may be provided for operating the gate, and I have shown one of many means that may be successfully used for this purpose, which resides in a controlling-lever I, connecting with a bell-crank lever J, which lever is pivoted to an L-shaped arm K, firmly secured to the main frame D of the gate and the means now to be described.

The bell-crank lever J is provided with eyes $n$ $o$ at its ends, the eye $n$ extending up through a slot $p$ in the L-shaped arm K, which is preferably constructed of channel or angle steel, said bell-crank lever being limited in its upward motion by coming in contact with the horizontal flange of the L-shaped arm. The controlling-lever I connects with the bell-crank lever J through the medium of the link L, said link having hooks at its ends which engage the eye $n$ of the bell-crank lever and the eyebolt $q$ upon the end of the controlling-lever I. (Shown more clearly in Fig. 2 of the drawings.) As the connections with the controlling-lever are substantially the same as in my former patent, dated May, 31, 1904, No. 761,580, it is not deemed necessary to show anything additional to what is shown in the drawings, as it would form no part of the present invention, the operating-levers and pulls connecting with the controlling-lever being a common expedient as a means for operating the gate.

When the end of the controlling-lever I is raised through the mechanism connecting therewith, the curved arm $r$ of the bell-crank lever J will be carried upward until it comes rigidly in contact with the flange $s$ of the L-shaped arm K, and this motion will cause the arm $t$ of said lever to take the position shown in dotted lines of Fig. 3 of the drawings. The rod N being loosely engaged with the latch M, the latch is drawn from its keeper and the gate unlatched, and by a light steady pull on the operating mechanism the gate will open, and when it passes the half-open point the gate will automatically finish its circuit when either opening or closing.

The gate-latch when not being operated by the levers is entirely independent thereof, thereby enabling the gate to be operated by hand with equal success.

The L-shaped arm may be braced by a rod $u$, which connects thereto and to the end bar $h$ of the main gate-frame, and in the construction of the gate and its various adjuncts and operating parts any suitable material may be used, either wood or metal, or both, as found desirable.

Having now fully described my invention, what I claim as new, and desire to secure by Letters Patent, is—

1. In a farm swinging gate, a main frame suitably braced with woven wire stretched bodily in said frame, means for keeping said wire in strain when in use, a sectional vertical center bar in which said wire is held, and clamping means for the sections of said sectional bar whereby the wire may be held tightly clamped when the straining means is not being adjusted, and means for operating the gate.

2. In a farm swinging gate, means for operating the same consisting of an L-shaped arm secured to the gate and having a horizontal flange, means adapted to engage said flange pivotally mounted at the outer end of the arm, and pivotally connected with the controlling-lever, whereby a downward pull on said controlling-lever will draw the latch from its keeper and cause the gate to swing.

3. In a farm swinging gate, a suitable arm rigidly secured to the gate and having a horizontal flange, a bell-crank lever pivotally connected thereto and coöperating with said flange, means directly connecting the bell-crank lever with the gate-latch, and means for operating the lever whereby the gate will be unlatched and the gate swung open or closed.

4. In a farm swinging gate, an arm fixedly secured to the gate and having a horizontal flange, a bell-crank lever pivotally connected thereto beyond the end of the gate, a latch-wire loosely connected to the lever and a controlling-lever connecting with the bell-crank lever, said bell-crank lever having a portion extending through an opening in said flange and limited in its movement thereby, whereby the operation of the controlling-lever will cause the latch to withdraw from its keeper and the gate to swing open or close, as set forth.

In testimony whereof I affix my signature in presence of two witnesses.

JAMES A. CLEMENTS.

Witnesses:
A. P. Lutz,
A. B. Beard.